United States Patent
Jiang et al.

(10) Patent No.: US 10,171,302 B2
(45) Date of Patent: Jan. 1, 2019

(54) NETWORK CONFIGURATION HEALTH CHECK IN VIRTUALIZED COMPUTING ENVIRONMENT

(71) Applicant: NICIRA, INC., Palo Alto, CA (US)

(72) Inventors: Jingchun Jiang, Beijing (CN); Benli Ye, Beijing (CN); Donghai Han, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 222 days.

(21) Appl. No.: 15/185,039

(22) Filed: Jun. 17, 2016

(65) Prior Publication Data
US 2017/0366401 A1   Dec. 21, 2017

(51) Int. Cl.
*G06F 15/177* (2006.01)
*H04L 12/24* (2006.01)
*H04L 12/46* (2006.01)
*H04L 5/00* (2006.01)
*H04L 12/947* (2013.01)

(52) U.S. Cl.
CPC ...... *H04L 41/0866* (2013.01); *H04L 12/4641* (2013.01); *H04L 5/0048* (2013.01); *H04L 49/25* (2013.01)

(58) Field of Classification Search
CPC . H04L 41/0866; H04L 12/4641; H04L 49/00; H04L 49/25
USPC .................................. 709/220–224, 250–252
See application file for complete search history.

(56) References Cited

U.S. PATENT DOCUMENTS

| | | | | |
|---|---|---|---|---|
| 5,854,901 A * | 12/1998 | Cole | ................ | H04L 29/12018 709/222 |
| 5,925,137 A * | 7/1999 | Okanoue | ................ | H04L 12/42 709/239 |
| 6,148,339 A * | 11/2000 | Nagamatsu | ......... | H04L 41/0233 709/224 |
| 8,886,834 B2 * | 11/2014 | Singh | ...................... | H04L 12/66 709/245 |
| 8,902,733 B2 * | 12/2014 | Enomoto | ............ | H04L 43/0811 709/224 |
| 9,215,609 B2 * | 12/2015 | Hu | ........................ | H04W 24/08 |
| 9,270,791 B2 * | 2/2016 | Mittapalli | ............. | H04L 69/324 |
| 9,467,416 B2 * | 10/2016 | Chan | ................... | H04L 41/0816 |
| 2012/0294139 A1 * | 11/2012 | Arai | ...................... | H04L 12/185 370/216 |

(Continued)

Primary Examiner — Bharat Barot
(74) Attorney, Agent, or Firm — Su IP Consulting (57) ABSTRACT

An example method is provided for a host to perform network configuration health check in a virtualized computing environment. The method may include selecting a source NIC and one or more destination NICs, based on a first network configuration of the host, generating one or more unicast probe packets that are addressed from the source NIC to the respective one or more destination NICs, and sending the one or more unicast probe packets to the respective one or more destination NICs from the source NIC via a physical switch connected to the host. The method may also include in response to receiving the one or more unicast probe packets from the physical switch, determining that there is a match between the first network configuration and a second network configuration, but otherwise, determining that there is a mismatch between the first network configuration and second network configuration.

21 Claims, 9 Drawing Sheets

(56) References Cited

U.S. PATENT DOCUMENTS

2016/0112269 A1\* 4/2016 Singh ................. H04L 41/0853
    709/224
2017/0026417 A1\* 1/2017 Ermagan ............ H04L 12/4641

\* cited by examiner

| Physical Network Adapter | VLAN Trunk | VLAN Health Status |
|---|---|---|
| NIC1 | 10, 100 | Supported |
| NIC1 | 500 | Not Supported |
| NIC2 | 10, 100 | Supported |
| NIC2 | 500 | Not Supported |
| NIC3 | 10, 100 | Supported |
| NIC3 | 500 | Not Supported |
| NIC4 | 10, 100 | Supported |
| NIC4 | 500 | Not Supported |

910

| Physical Network Adapter | VLAN Trunk | MTU Health Status |
|---|---|---|
| NIC1 | 10 | Supported |
| NIC1 | 100 | Not Supported |
| NIC2 | 10 | Supported |
| NIC2 | 100 | Not Supported |
| NIC3 | 10 | Supported |
| NIC3 | 100 | Not Supported |
| NIC4 | 10 | Supported |
| NIC4 | 100 | Not Supported |

Fig. 9

NETWORK CONFIGURATION HEALTH CHECK IN VIRTUALIZED COMPUTING ENVIRONMENT

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Datacenter (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

To provide network connectivity for virtual machines supported by a host, a physical switch is used to forward packets to and from the host. However, in practice, network connectivity issues may occur because of mismatched network configuration between the host and the physical switch.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Example network connectivity issues between a host and a physical switch will now be explained in more detail using FIG. 1, which is a schematic diagram illustrating example virtualized computing environment 100 in which network configuration health check may be performed. It should be understood that, depending on the desired implementation, virtualized computing environment 100 may include additional and/or alternative components than that shown in FIG. 1.

Virtualized computing environment 100 includes multiple hosts 110 (one shown in detail for simplicity; also known as "computing devices", "host computers", "host devices", "physical servers", "server systems", etc.) that are connected to physical network 102. Each host 110 includes suitable virtualization software (e.g., hypervisor 112) and hardware 114 to support virtual machines, such as "VM1" 121, "VM2" 122 and "VM3" 123. Although three are shown for simplicity, each host 110 may be supporting tens or hundreds of virtual machines in practice.

Virtual machine 121/122/123 represents a software implementation of a physical machine. Although examples of the present disclosure refer to "virtual machines," it should be understood that virtual machine 121/122/123 running within host 110 are merely one example of a "virtualized computing instance" or "workload." In general, a virtualized computing instance may represent an addressable data compute node or isolated user space instance. In practice, any suitable technology may be used to provide isolated user space instances, not just hardware virtualization. For example, other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computation environments, containing virtual equivalents of the hardware and system software components of a physical computing system.

Hypervisor 112 maintains a mapping between underlying hardware 114 of host 110 and virtual resources allocated to virtual machine 121/122/123. Hardware 114 includes suitable physical components (some not shown for simplicity), such as Central Processing Unit (CPU), memory (e.g., random access memory), storage disk (e.g., solid state drive, hard disk drive), and physical network interface controllers (NICs) 151-154, etc. Virtual resources are allocated to virtual machine 121/122/123 to support application(s) 124/125/126 running on top of guest operating system 127/128/129, etc. For example, corresponding to hardware 114, the virtual resources may include virtual CPU, virtual memory, virtual disk, virtual network interface controller (vNIC), etc.

Virtual machine monitors (VMMs) 131, 132, 133 implemented by hypervisor 112 are to emulate hardware resources. For example, VMM 131 is to emulate vNIC 134 to provide network access for "VM1" 121, VMM 132 to emulate vNIC 135 for "VM2" 122, and VMM 133 to emulate vNIC 136 for "VM3" 123. In practice, VMM 131/132/133 may be considered as components that are part of virtual machine 121/122/123, or alternatively, separated from virtual machine 121/122/123. In both cases, VMM 131/132/133 maintains the state of vNIC 134/135/136 and data relating to the state is migrated with virtual machine 121/122/123.

Hypervisor 112 further supports virtual switch 140 to handle traffic forwarding to and from "VM1" 121, "VM2" 122 and "VM3" 123. For example, virtual machine 121/122/123 may send egress (i.e., outgoing) packets and receive ingress packets (i.e., incoming) via physical network 102 during a communication session with another node. Virtual switch 140 receives egress packets from, and sends ingress packets to, virtual machine 121/122/123 via vNIC 134/135/136. The node with which virtual machine 121/122/123 communicates may be an external host, virtual machine, etc. The packets may be sent and received via one of physical NICs 151-154 of host 110.

Physical switch 160 provides network connectivity to host 110 and other nodes (not shown in detail for simplicity). In the example in FIG. 1, "NIC1" 151 of host 110 is connected to "NICA" 161 of physical switch 160 via a first physical link (see 171); "NIC2" 152 to "NICB" 162 via a second physical link (see 172); "NIC3" 153 to "NICC" 163 via a third physical link (see 173); and "NIC4" 154 to "NICD" 164 via a fourth physical link (see 174). In practice, multiple physical NICs may be grouped together to form a logical NIC using any suitable approach, such as NIC teaming, link aggregation, port trunking, link bundling, NIC bonding, etc. For example, "NIC1" 151 may represent a link aggregation group (LAG) formed using link aggregation control protocol (LACP) that is regarded as a single NIC.

As used herein, the term "physical switch" may refer generally to any suitable physical network element configured to receive and forward packets, which may layer-3 router, layer-2 switch, gateway, bridge, etc. Depending on the network topology in virtualized computing environment 100, a "switch" may be an access layer switch, top-of-rack (ToR) switch, aggregate switch, spine switch, etc. The term "layer-2" generally refers to a Media Access Control (MAC) layer and "layer-3" to a network layer in the Open System Interconnection (OSI) model, although the concepts described herein may be applicable to other networking models. The term "packet" may refer generally to a group of bits that can be transported together, and may be in another form, such as "frame", "message", "segment", etc.

Network connectivity issues may arise in virtualized computing environment 100 when there is a mismatch between the network configuration of host 110 and that of physical switch 160. For example, referring to 180 in FIG. 1, virtual switch 140 is configured to support multiple Virtual Local Area Networks (VLANs), such as VLAN10, VLAN100 and VLAN500, and packets with a Maximum Transmission Unit (MTU) of 9000 bytes (so-called "jumbo packets"). In practice, the different VLANs may be configured on different port groups on virtual switch 140. On the other hand, referring to 182 in FIG. 1, physical switch 160 is configured to support MTU=9000 bytes for VLAN range 10-20, but only MTU=1500 bytes for VLAN range 100-200. Physical switch 160 does not support VLAN500. In this example, all NICs 161-164 of physical switch 160 have the same VLAN/MTU configuration for simplicity. It should be understood, however, that each NIC may have a different network configuration in practice.

Due to the mismatched MTU configuration for VLAN100, egress jumbo packets from "VM1" 121 to an external node (i.e., not on host 110) on VLAN100 will be forwarded by virtual switch 140, but dropped by physical switch 160 because the jumbo packets are larger than the allowed 1500 bytes. Also, since physical switch 160 does not support VLAN500, all VLAN500 packets from virtual switch 140 will be dropped by physical switch 160. In practice, network configuration errors are often difficult to identify, such as when different teams are responsible for configuring virtual switch 140 and physical switch 160.

Conventionally, network configuration mismatch may be identified using broadcast probe packets. For example in FIG. 1, to test whether physical switch 160 supports VLAN10 and MTU=9000 bytes, host 110 may send a broadcast probe packet from "NIC1" 151 to "NICA" 161 of physical switch 160. Since VLAN10 and MTU=9000 bytes are supported by physical switch 160, the broadcast probe packet will be broadcasted to all of its outgoing interfaces, except for "NICA" 161 via which the broadcast probe packet is received. In this case, physical switch 160 sends the broadcast probe packet to host 110 via "NICB" 162, "NICC" 163 and "NICD" 164.

Once host 110 receives the broadcast probe packet via corresponding "NIC2" 152, "NIC3" 153 and "NIC4" 154, responses in the form of acknowledgement (ACK) packets are generated and sent to the sender (i.e., "NIC1" 151 of host 110) via physical switch 160. In particular, ACK packets are sent from respective "NIC2" 152, "NIC3" 153 and "NIC4" 154 via physical switch 160. Once the ACK packets are received via "NIC1" 151, host 110 may learn that VLAN10 and MTU=9000 bytes are supported by physical switch 160. The above is repeated for other interfaces (i.e., "NIC2" 152, "NIC3" 153 and "NIC4" 154) and for other configurations (i.e., VLAN100 and VLAN500).

The conventional approach presents a scalability problem. The number of broadcast probe packets sent by host 110 to physical switch 160 will be N×M, where N is the number of physical NICs of host 110 and M is the number of VLANs to be checked. For most modern hardware servers, N is at least two and the VLAN range may be as large 1-4094. Further, physical switch 160 is usually connected to other hosts to which the broadcast probe packets are sent, and from which ACK packets are also received. The large number of broadcast probe packets and corresponding ACK packets creates a lot of processing burden on physical switch 160. This may also cause a "lookup table flush" problem, which occurs when physical switch 160 has to update its address lookup table (e.g., content addressable memory (CAM) table) based on the large number of packets. This causes the table to overflow when its maximum size is reached, thereby adversely affecting the performance of physical switch 160.

Network Configuration Health Check

According to examples of the present disclosure, network configuration health check may be improved by reducing the number of probe packets required between host 110 and physical switch 160. Unlike the conventional approach, unicast probe packets are generated and sent between NICs 151-154 of host 110 to reduce the processing burden at both host 110 and physical switch 160 and improve the efficiency of the health check process. As used herein, the term "health check" may refer generally to the process of determining whether there is a mismatch between a network configuration of host 110 and that of physical switch 160. The health check may be performed for one or more configuration parameters (e.g., VLAN, MTU, etc.).

Figure 1:
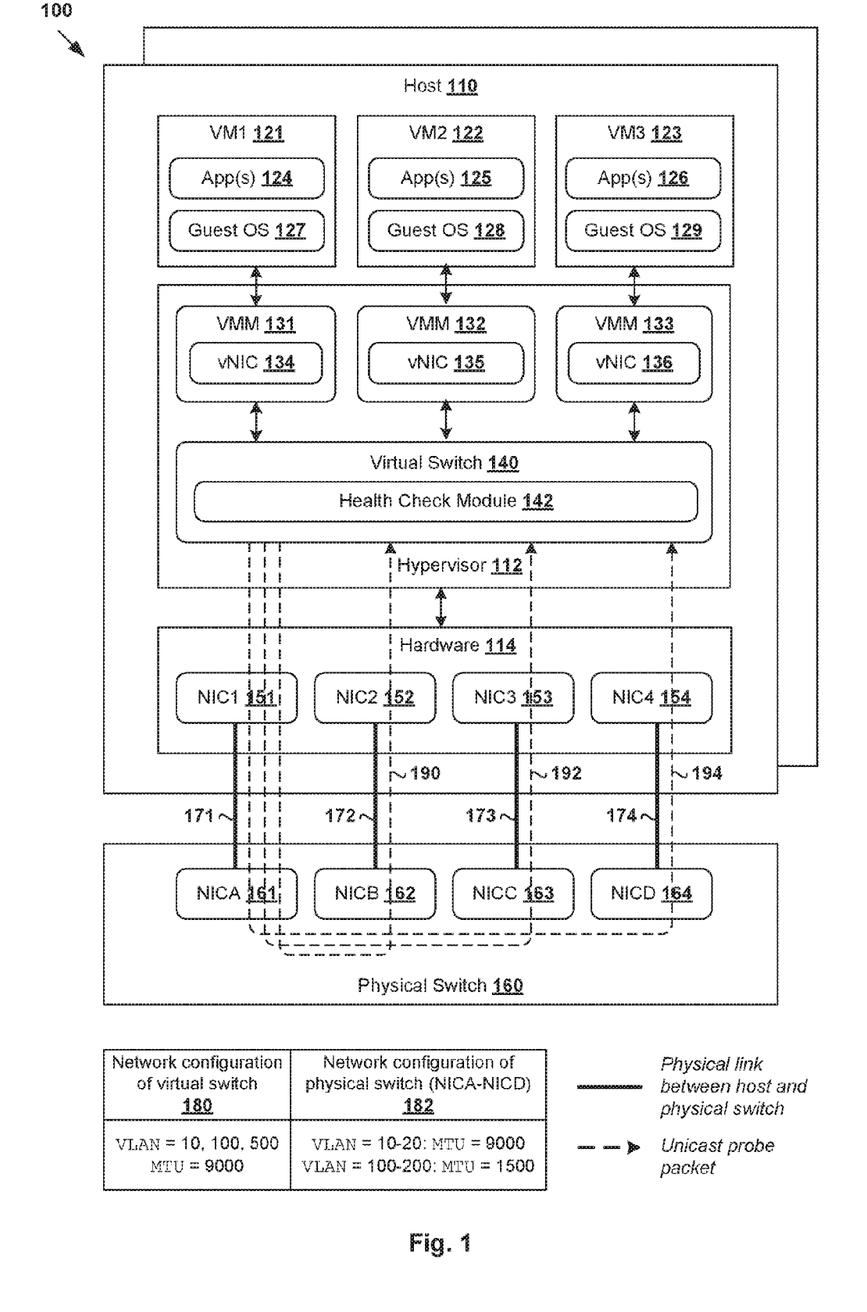
FIG. 1 is a schematic diagram illustrating an example virtualized computing environment in which network configuration health check may be performed.
Figure 2:
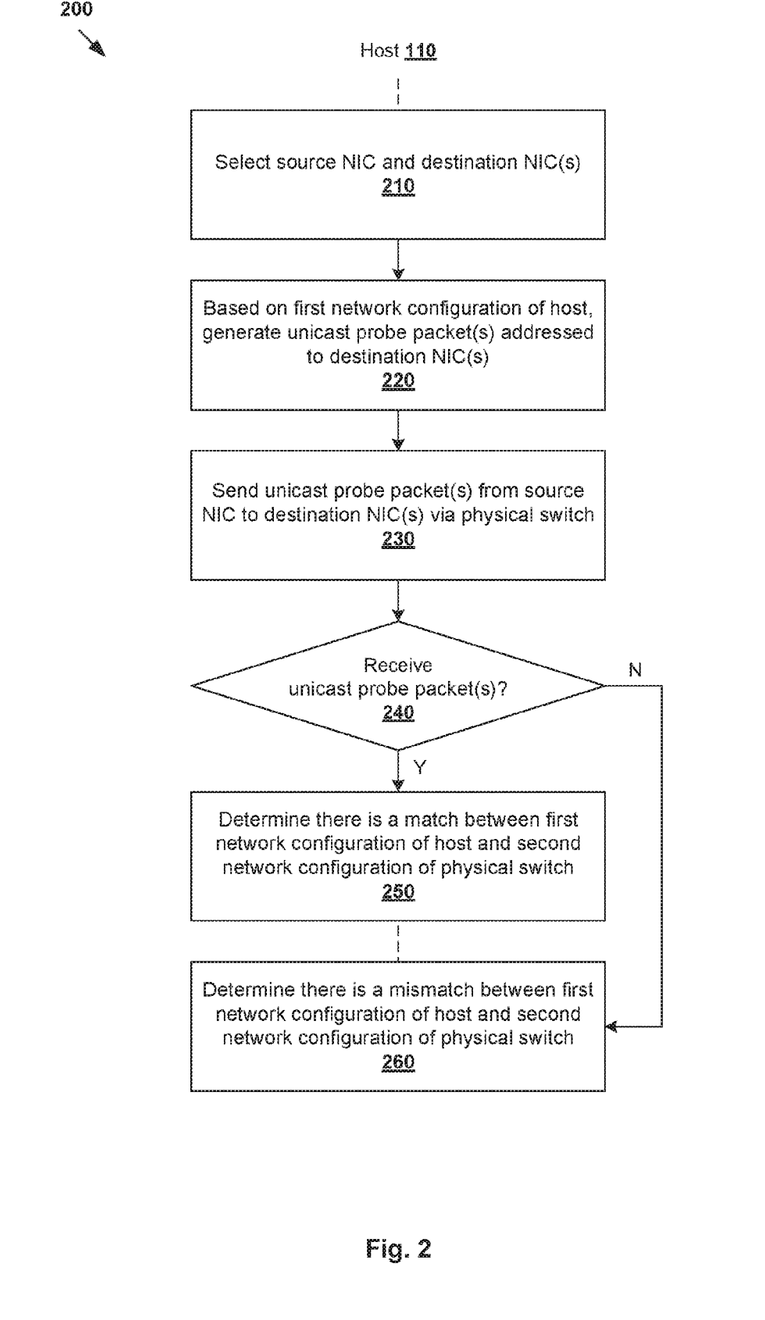
FIG. 2 is a flowchart of an example process for a host to perform network configuration health check.

In more detail, FIG. 2 is a flowchart of example process 200 for host 110 to perform network configuration health check. Example process 200 may include one or more operations, functions, or actions illustrated by one or more blocks, such as 210 to 260. The various blocks may be combined into fewer blocks, divided into additional blocks, and/or eliminated depending on the desired implementation. In the example in FIG. 1, example process 200 may be performed by hypervisor 112 of host 110, such as using health check module 142 implemented by virtual switch 140, etc.

At 210 in FIG. 2, a source NIC and one or more destination NICs are selected from NICs 151-154 of host 110. For example, at a first iteration, "NIC1" 151 may be selected as the source NIC to send unicast probe packets. In this case, "NIC2" 152, "NIC3" 153 and "NIC4" 154 are selected as destination NICs to receive the unicast probe packets.

At 220 in FIG. 2, based on first network configuration 180 of host 110, unicast probe packets are generated. At 230 in FIG. 2, unicast probe packets 190, 192, 194 are sent from source "NIC1" 151 to respective "NIC2" 152, "NIC3" 153 and "NIC4" 154 via physical switch 160. For example in FIG. 1, based on the configuration of VLAN10 and MTU=9000 bytes at virtual switch 140, three unicast probe packets are generated: a first packet (see 190) addressed from "NIC1" 151 to destination "NIC2" 152, a second packet (see 192) addressed from "NIC1" 151 to "NIC3" 153, and a third packet addressed from "NIC1" 151 to "NIC4" 154.

At 240 and 250 in FIG. 2, in response to "NIC2" 152, "NIC3" 153 and "NIC4" 154 receiving unicast probe packets 190, 192, 194 from the physical switch 160, it is determined that there is a match between first network configuration 180 (e.g., VLAN10 and MTU=9000 bytes) of host 110 and second network configuration 182 (e.g., VLAN10-20 and MTU=9000 bytes) of the physical switch 160. Otherwise (i.e., not received), at 260 in FIG. 5, it is determined there is a mismatch between the network configurations.

Since unicast probe packets 190, 192, 194 are used in example process 200, it is not necessary for physical switch 160 to broadcast the packets to all of its outgoing interfaces, especially interfaces connecting physical switch 160 to other hosts (not shown for simplicity). Further, unlike the conventional approach, it is not necessary to rely on ACK packets from one NIC to another NIC of the same host. Instead, network configuration health check may be performed based on whether "NIC2" 152, "NIC3" 153 and "NIC4" 154 receive respective unicast probe packets 190, 192, 194. Compared to the conventional approach, network resource consumption and processing burden may be reduced at both host 110 and physical switch 160, especially when health check is required for a large number of VLANs to be checked and/or host 110 has many NICs.

As will be further described below, example process 200 may be iteratively performed using different source and destination NICs to perform health check for all VLANs and MTU configured for virtual switch 140 and for all NICs 151-154 of host 110. Although exemplified using VLAN and MTU, it should be understood that first network configuration 180 of host 110 and second network configuration 182 of physical switch 160 may include any additional or alternative network configuration parameters. Throughout the present disclosure, references herein to a VLAN or MTU being "not supported" by a device or module (e.g., physical switch, virtual switch, NIC, etc.) may refer generally to the device or module being not configured, or otherwise not able, to support the VLAN or MTU.

In the following, various examples will be described using FIG. 3 to FIG. 9. In particular, example detailed processes will be described using FIG. 3 and FIG. 5, example iterations using FIGS. 4A-4C, 6A-6B, 7A-7B and 8A-8B and example results using FIG. 9. Examples of the present disclosure may be performed by any suitable component of host 110, such as health check module 142.

Iterative Process

Figure 3:
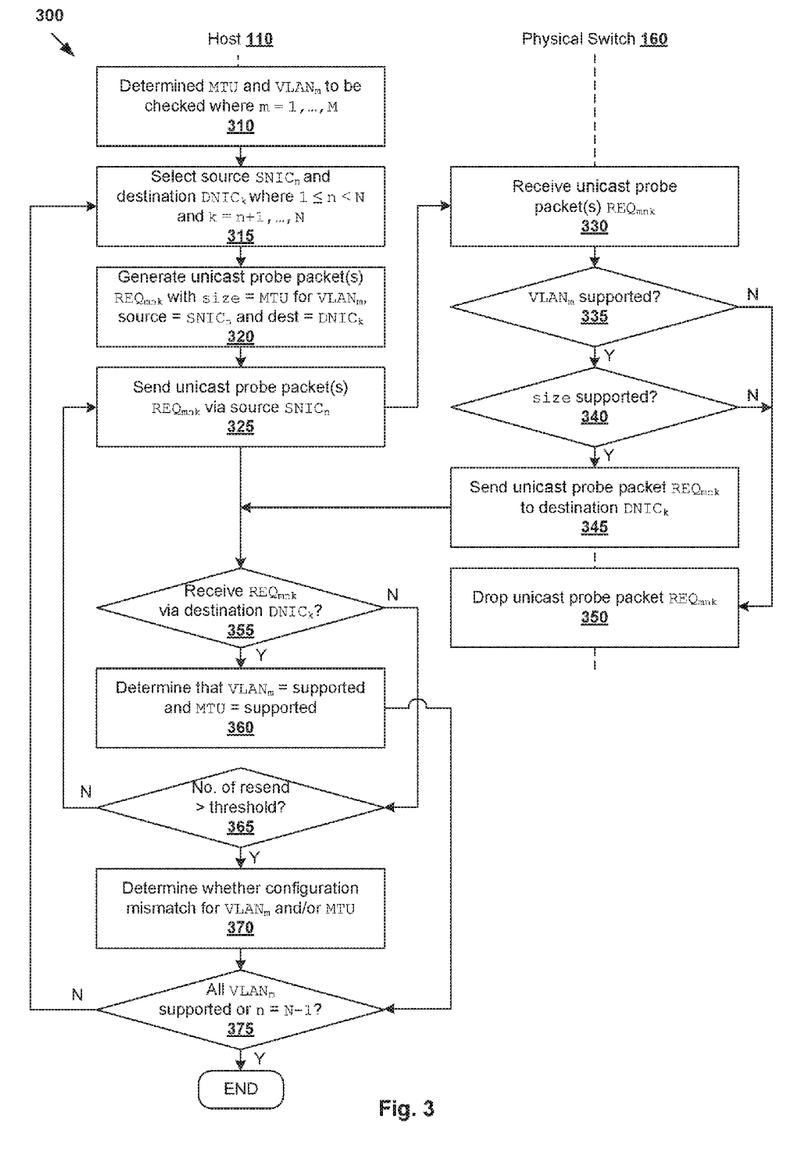
FIG. 3 is a flowchart of an example iterative process for a host to perform network configuration health check.

FIG. 3 is a flowchart of example iterative process 300 for host 110 to perform network configuration health check. Example process 300 may include one or more operations, functions, or actions illustrated by one or more blocks, such as 310 to 375. The various blocks may be combined into fewer blocks, divided into additional blocks, and/or eliminate d depending on the desired implementation.

At 310 in FIG. 3, host 110 determines the relevant network configuration to be checked, such as VLAN and MTU configuration of virtual switch 140. Each VLAN configuration for which health check is required may be denoted as $VLAN_m$, where m=1, . . . , M. In the case of M=3 in the example in FIG. 1, $VLAN_1$=VLAN10, $VLAN_2$=VLAN100 and $VLAN_3$=VLAN500. As explained using FIG. 1, virtual switch 140 is configured with MTU=9000 bytes.

At 315 in FIG. 3, host 110 selects a source NIC to send, and destination NIC(s) to receive, unicast probe packets. The source NIC may be denoted as $SNIC_n$ and each destination NIC as $DNIC_k$ using $1 \le n \le N-1$ and $n+1 \le k \le N$. The maximum number iterations is N−1 and fewer iterations may be required depending on the result of each iteration.

In the following, three (i.e., N−1=3) iterations will be discussed. At a first iteration (i.e., n=1 and k=2, 3, 4), $SNIC_1$="NIC1" 151, $DNIC_2$="NIC2" 152, $DNIC_3$="NIC3" 153 and $DNIC_4$="NIC4" 154. At a second iteration (i.e., n=2 and k=3, 4), $SNIC_2$="NIC2" 152, $DNIC_3$="NIC3" 153 and $DNIC_4$="NIC4" 154. During a third and final iteration (i.e., n=3 and k=4), $SNIC_3$="NIC3" 153 and $DNIC_4$="NIC4" 154.

(a) First Iteration (n=1 and k=2, 3, 4)

At 320 and 335 in FIG. 3, host 110 generates and sends unicast probe packets denoted as $REQ_{mnk}$ based on configuration of $VLAN_m$ and MTU at virtual switch 140. In particular, each unicast probe packet $REQ_{mnk}$ is configured with size=MTU, and includes an identifier of $VLAN_m$, a source address associated with $SNIC_n$ and a destination address associated with $DNIC_k$.

In practice, the unicast probe packets may be layer-2 packets, each having a layer-2 header that includes the identifier of $VLAN_m$, a source MAC address of $SNIC_n$ and a destination MAC address of $DNIC_k$. The MAC addresses may be actual MAC addressed of $SNIC_n$ and $DNIC_k$, or MAC addresses of shadow ports generated for $SNIC_n$ and $DNIC_k$. In a distributed virtual switch (DVS) implementation, the payload of each unicast probe packet may include other information, such as an identifier of host 110 in, port group identifier, VDS identifier, etc. The unicast probe packets may be generated using any suitable protocol, such as echo-type layer-2 protocol, etc.

At 330, 335 and 340 in FIG. 3, in response to receiving each unicast probe packet $REQ_{mnk}$, physical switch 160 determines whether the packet size and $VLAN_m$ are supported. If yes (both supported), at 345 in FIG. 3, physical switch 160 forwards the unicast probe packet $REQ_{mnk}$ to its destination address associated with $DNIC_k$. Otherwise (size and/or $VLAN_m$ not supported), at 350 in FIG. 3, the packet is dropped.

Figure 4A:
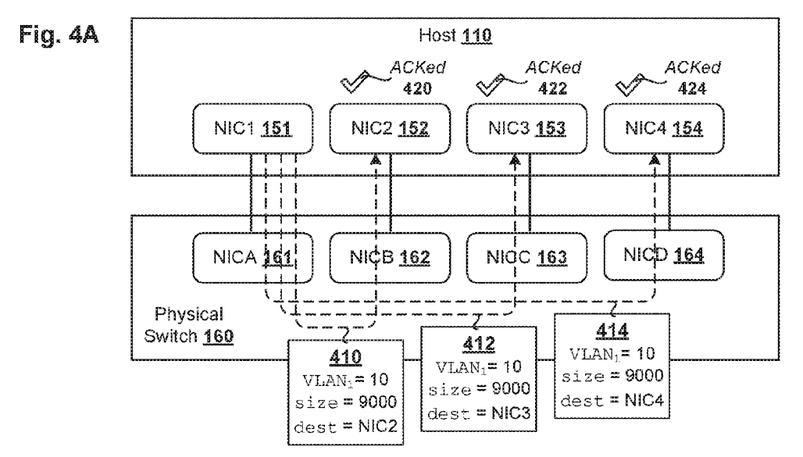
FIG. 4A is a schematic diagram illustrating a first set of unicast probe packets for a first iteration of a network configuration health check according to the example in FIG. 3.

In a first example of $VLAN_1$=VLAN10, FIG. 4A is a schematic diagram illustrating a first set of unicast probe packets 410, 412, 414 for a first iteration of a network configuration health check according to the example in FIG. 3. Each packet 410/412/414 includes an identifier of $VLAN_1$=VLAN10 and has a size of MTU=9000 bytes. First probe packet 410 is addressed from $SNIC_1$="NIC1" 151 to $DNIC_2$="NIC2" 152, second probe packet 412 to $DNIC_3$="NIC3" 153 and third probe packet 414 to $DNIC_4$="NIC4" 154. Since physical switch 160 supports MTU=9000 bytes for VLAN range between VLAN10 and VLAN20 (see 182 in FIG. 1), probe packets 410, 412, 414 are forwarded to the respective $DNIC_2$="NIC2" 152, $DNIC_3$="NIC3" 153 and $DNIC_4$="NIC4" 154.

Figure 4B:
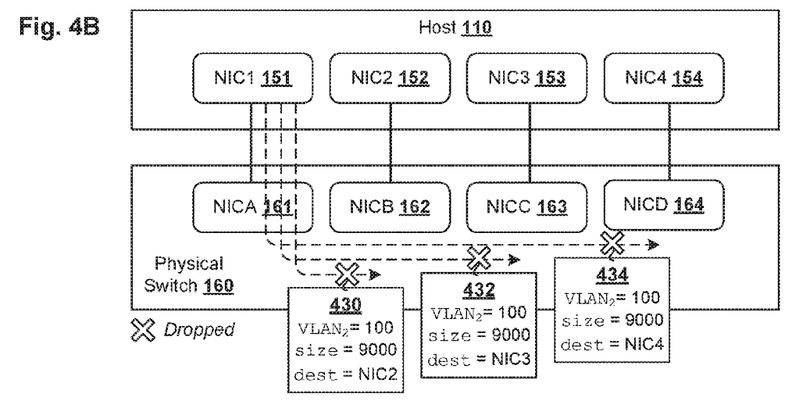
FIG. 4B is a schematic diagram illustrating a second set of unicast probe packets for a first iteration of a network configuration health check according to the example in FIG. 3.

In a second example of $VLAN_2$=VLAN100, FIG. 4B is a schematic diagram illustrating a second set of unicast probe packets 430, 432, 434 for a first iteration of a network configuration health check according to the example in FIG. 3. Each packet 430/432/434 includes an identifier of $VLAN_2$=VLAN100 and has a size of MTU=9000 bytes. First probe packet 430 is addressed from $SNIC_1$="NIC1" 151 to $DNIC_2$="NIC2" 152, second probe packet 432 to $DNIC_3$="NIC3" 153 and third probe packet 414 to $DNIC_4$="NIC4" 154. Since physical switch 160 supports MTU=1500 bytes (i.e., not 9000 bytes) for VLAN100 to VLAN200, probe packets 430, 432, 434 are dropped without being forwarded.

Figure 4C:
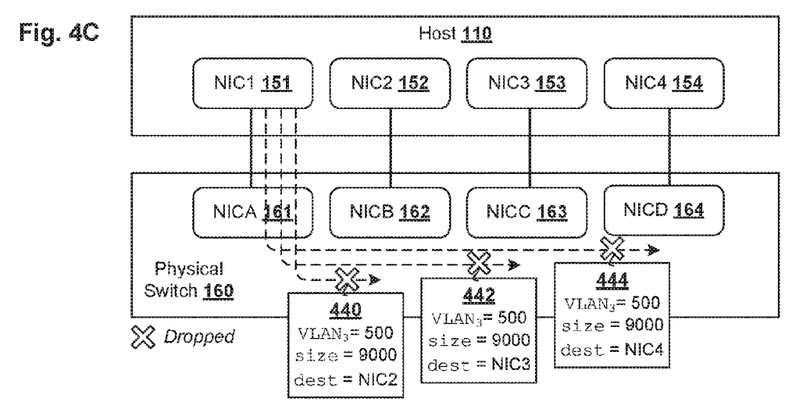
FIG. 4C is a schematic diagram illustrating a third set of unicast probe packets for a first iteration of a network configuration health check according to the example in FIG. 3.

In a third example of $VLAN_3$=VLAN500, FIG. 4C is a schematic diagram illustrating a third set of probe packets 440, 442, 444 for a first iteration of a network configuration health check according to the example in FIG. 3. Probe packets 440, 442, 444 are configured to check whether physical switch 160 supports $VLAN_3$=VLAN500 and packet size=9000 bytes. First probe packet 440 is addressed to $DNIC_2$="NIC2" 152, second probe packet 442 to $DNIC_3$="NIC3" 153 and third probe packet 444 to $DNIC_4$="NIC4" 154. Since physical switch 160 does not support VLAN500 at all, probe packets 440, 442, 444 are also dropped.

At 355 and 360 in FIG. 3, for the health check of VLAN10, in response to receiving probe packets 410, 412, 414 via respective "NIC2" 152, "NIC3" 153 and "NIC4" 154, host 110 determines that all NICs 161-164 of physical switch 160 supports MTU=9000 bytes for $VLAN_1$=VLAN10. Since source "NIC1" 151 and destinations "NIC2" 152, "NIC3" 153 and "NIC4" 154 reside on the same host, the receipt of probe packets 410, 412, 414 may be taken as a form of "forged" acknowledgement, as indicated at 420, 422, 424 in FIG. 4A. This means that it is not necessary to send ACK packets from destinations "NIC2" 152, "NIC3" 153 and "NIC4" 154 to source "NIC1" 151. There will be no ACK packets transmitted via physical links 171-174 connecting host 110 with physical switch 160.

At 355 and 365 in FIG. 3, for the health check of VLAN100 and VLAN500, after determining that probe packets 430, 432, 434, 440, 442, 444 are not received (e.g., within a predetermined timeframe), host 110 determines whether to resend the probe packets, such as based on a predetermined threshold (e.g., maximum one resend). The purpose is to ensure that probe packets 430, 432, 434, 440, 442, 444 are not affected by other issues, such as failure of physical links 171-174 connecting host 110 with physical switch 160, failure or restart of physical switch 160, etc. If the resend threshold is not exceeded, example process 300 proceeds to block 325 again to resend probe packets 430, 432, 434 for VLAN100 and probe packets 440, 442, 444 for VLAN500.

At 370 in FIG. 3, in response to determining not to resend (e.g., after the number of resend exceeds the threshold), host 110 proceeds to determine whether a particular network configuration parameter (e.g., MTU) is not matched. For example, this involves determining whether physical switch 160 supports a particular $VLAN_m$ but not the corresponding MTU (i.e., in the case in FIG. 4A), or physical switch 160 does not support $VLAN_m$ at all (i.e., in the case of FIG. 4B).

Figure 5:
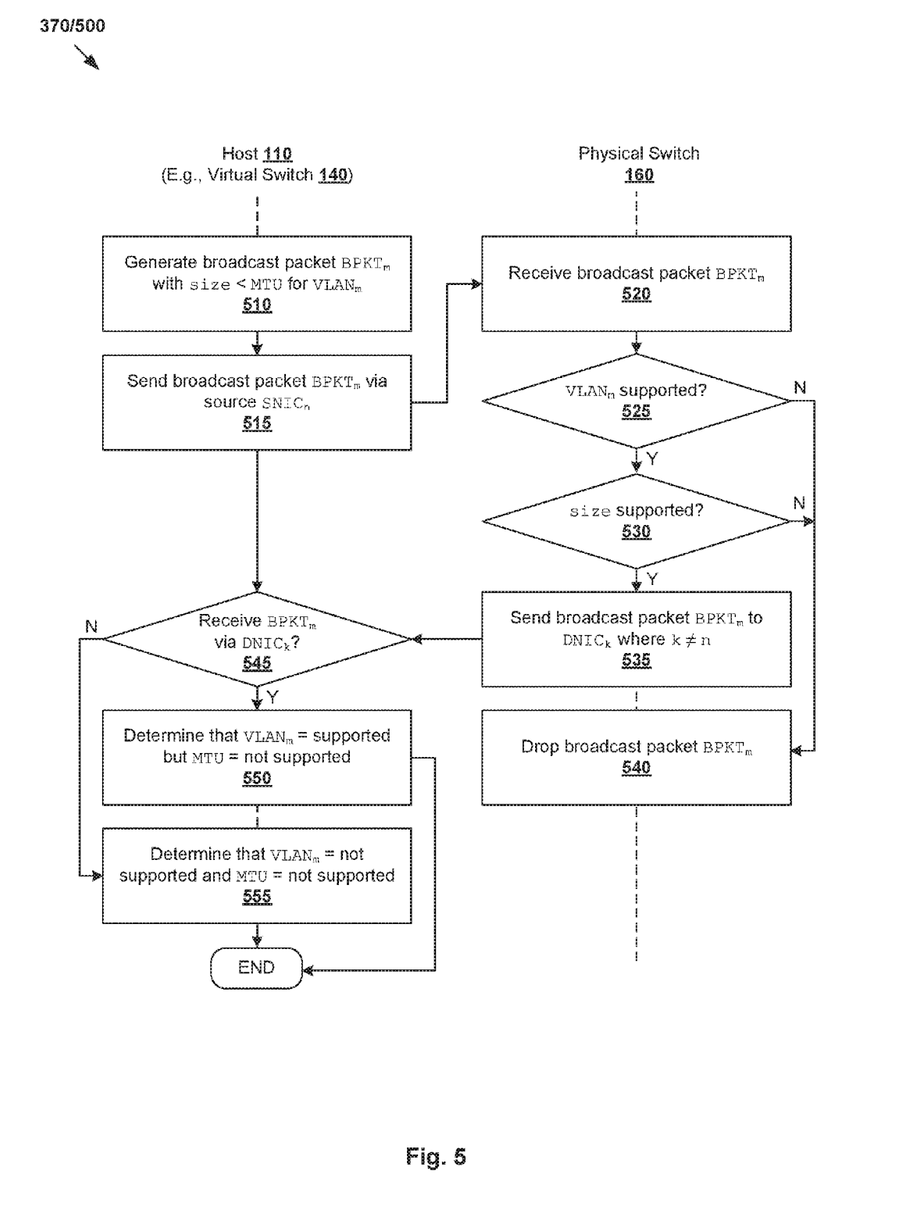
FIG. 5 is a flowchart of an example process for host to perform network configuration health check in the event unicast probe packets are not received.

In one example, block 370 in FIG. 3 may involve sending "small" broadcast packets to physical switch 160. Here, the term "small" may refer generally to being significantly smaller than the MTU, such as in the order of a few hundred bytes (e.g., 256 bytes). The small broadcast packets serve as ping messages to test whether physical switch 160 supports $VLAN_m$. In more detail, FIG. 5 is a flowchart of example detailed process 370/500 for host 110 to perform network configuration health check in the event that unicast probe packets are not received. Example process 500 may include one or more operations, functions, or actions illustrated by one or more blocks, such as 510 to 555. The various blocks may be combined into fewer blocks, divided into additional blocks, and/or eliminate d depending on the desired implementation.

At 510 and 515 in FIG. 5, host 110 generates and sends broadcast packets with size=256 bytes (i.e., <<MTU=9000 bytes) to test whether $VLAN_2$=VLAN100 and $VLAN_3$=VLAN500 are supported by physical switch 160. Each small broadcast packet may be denoted as $BPKT_m$ for a particular $VLAN_m$. In this case, the source address of $BPKT_m$ identifies source "NIC1" 151, but its destination address may be any suitable broadcast address, such as layer-2 MAC address "FF:FF:FF:FF:FF:FF", etc.

At 520, 525 and 530 in FIG. 5, in response to receiving small broadcast packet $BPKT_m$, physical switch 160 determines whether $VLAN_m$ and corresponding packet size (e.g., 256 bytes) are supported. At 535 in FIG. 5, if both are supported, physical switch 160 broadcasts $BPKT_m$ to all its outgoing interfaces, except for the interface via which the small broadcast packet is received. Otherwise, at 540 in FIG. 5, the small broadcast packet $BPKT_m$ is dropped.

Figure 6A:
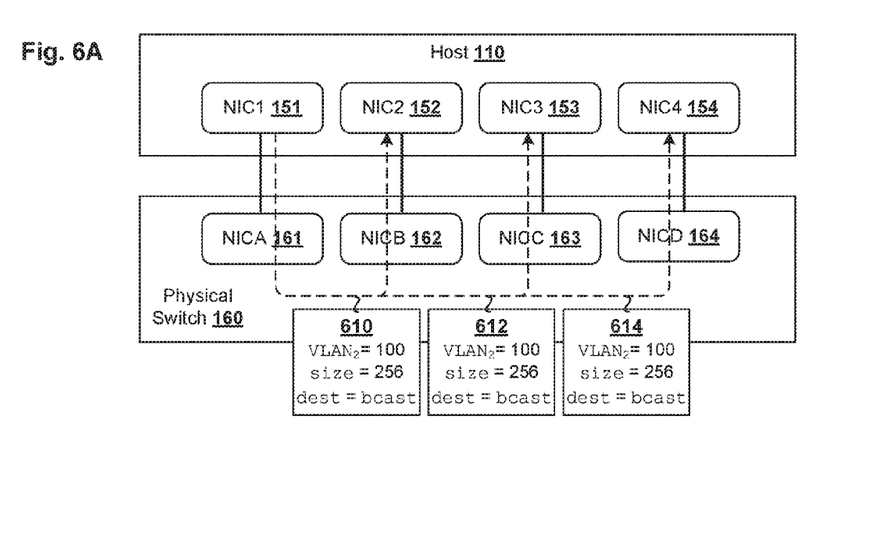
FIG. 6A is a schematic diagram illustrating an example first small broadcast packet for a first iteration of a network configuration health check according to the example in FIG. 5.

In the case of $VLAN_2$=VLAN100, FIG. 6A is a schematic diagram illustrating example first small broadcast packet for a first iteration of a network configuration health check according to the example in FIG. 5. Since physical switch 160 supports up to MTU=1500 bytes for $VLAN_2$=VLAN100, the small broadcast packet is forwarded to "NIC2" 152 (see 610), "NIC3" 153 (see 612) and "NIC4" 154 (see 610). As such, at 545 and 550 in FIG. 5, in response to receiving small broadcast packets 610, 612, 614 via respective "NIC2" 152, "NIC3" 153 and "NIC4" 154, host 110 determines that physical switch 160 supports VLAN$_2$=VLAN100, but MTU=9000 bytes.

Figure 6B:
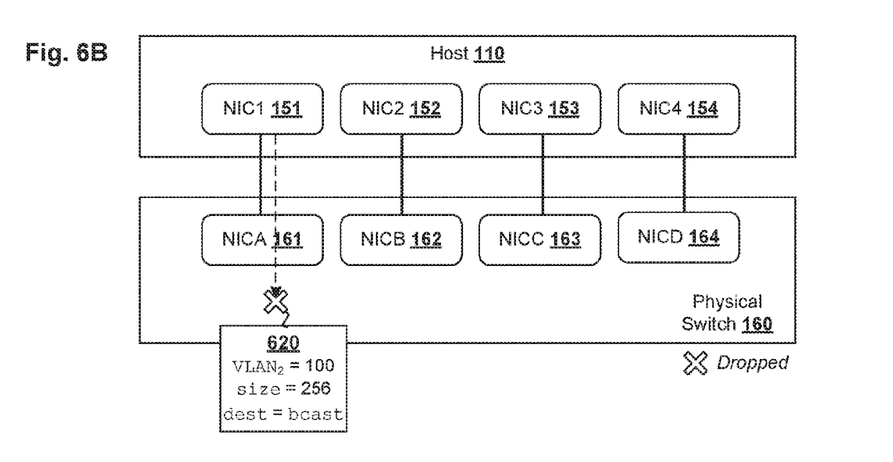
FIG. 6B is a schematic diagram illustrating an example second small broadcast packet for a first iteration of a network configuration health check according to the example in FIG. 5.

In the case of VLAN$_3$=VLAN500, FIG. 6B is a schematic diagram illustrating example second small broadcast packet for a first iteration of a network configuration health check according to the example in FIG. 5. Since physical switch 160 does not support VLAN$_3$=VLAN500 at all, small broadcast packet 620 is dropped. As such, at 545 and 555 in FIG. 5, in response to not receiving small broadcast packet 620 (e.g., within a predetermined timeframe), host 110 determines VLAN$_3$=VLAN500 is not supported by "NIC1" 151 and physical switch 160. This completes example process 500 in FIG. 5.

Referring to FIG. 3 again, at 375 in FIG. 3, host 110 determines whether a stopping condition of example process 300 is met. For example, one stopping condition is that all VLAN$_m$ for m=1, . . . , M are determined to be supported by physical switch 160. For example, if health check is only performed for VLAN$_1$=VLAN10 and VLAN$_2$=VLAN100, only one iteration is required for example process 300.

Another stopping condition is that n=N−1, which means that the current source NIC is the penultimate SNIC$_{N-1}$ and it is not necessary to send further unicast probe packets. Since neither condition is met at the first iteration, a second iteration is required to send probe packets from a different source NIC selected from DNIC$_k$.

(b) Second Iteration (n=2 and k=3, 4)

The second iteration is similar to the first iteration, except that there is only one outstanding VLAN$_3$=VLAN500 to be checked. A different source SNIC$_2$="NIC2" 152 (previously a destination NIC at the first iteration) is used to send probe packets to DNIC$_3$="NIC3" 153 and DNIC$_4$="NIC4" 154. According to 315, 320 and 325 in FIG. 3, host 110 generates and sends unicast probe packets REQ$_{mnk}$ that are configured with size=MTU and include an identifier of VLAN$_3$=VLAN500, a source address associated with source "NIC2" 152 and a destination address associated with "NIC3" 153 or "NIC4" 154.

Figure 7A:
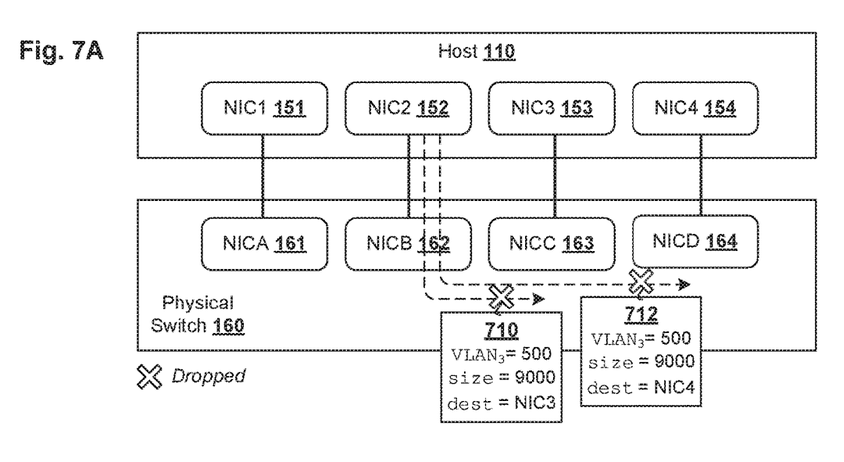
FIG. 7A is a schematic diagram illustrating example unicast probe packets for a second iteration of a network configuration health check according to the example in FIG. 3.

FIG. 7A is a schematic diagram illustrating example unicast probe packets 710, 712, for a second iteration of a network configuration health check according to the example in FIG. 3. Probe packets 710, 712 are configured to perform health check for VLAN$_3$=VLAN500 and MTU=9000 bytes using "NIC2" 152 as the source NIC. According to 330, 335, 340 and 350 in FIG. 3, since "NICB" 162 of physical switch 160 does not support VLAN$_3$=VLAN500, probe packets 710, 712 are dropped. Further, according to 355 and 360 in FIG. 3, host 110 may resend probe packets 710, 712 (e.g., for a predetermined number of times).

Figure 7B:
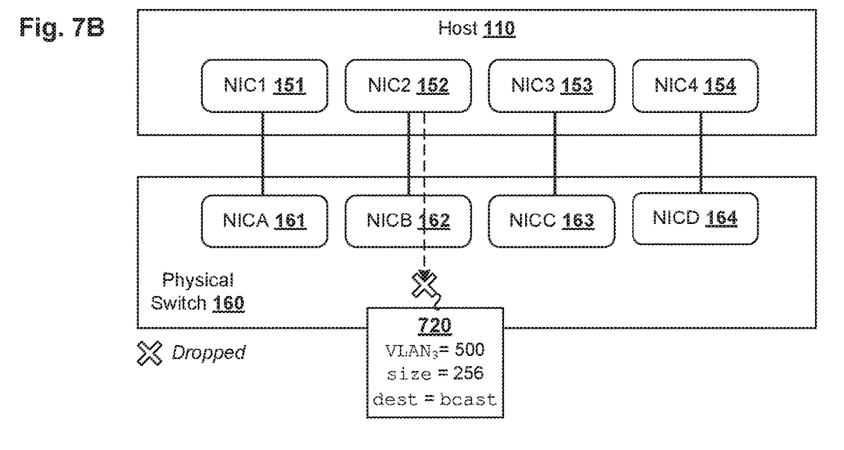
FIG. 7B is a schematic diagram illustrating an example small broadcast packet for a second iteration of a network configuration health check according to the example in FIG. 5.

FIG. 7B is a schematic diagram illustrating example small broadcast packet 720 for a second iteration of a network configuration health check according to the example in FIG. 5. In particular, according to 370 in FIG. 3 and example process 500 in FIG. 5, small broadcast packet 720 is sent from "NIC2" 152 of host 110 to "NICB" 162 of physical switch 160. Once again, since "NICB" 162 of physical switch 160 does not support VLAN$_3$=VLAN500, small broadcast packet 720 is dropped.

According to 545 and 555 in FIG. 3, host 110 determines that there is a mismatch between VLAN500 configuration at virtual switch 140 and the VLAN configuration at "NICB" 162 of physical switch 160 to which "NIC2" 152 is connected. Referring to 375 in FIG. 3 again, since no stopping condition is not met, a further iteration is performed using a different source NIC.

(c) Third Iteration (n=3 and k=4)

Figure 8A:
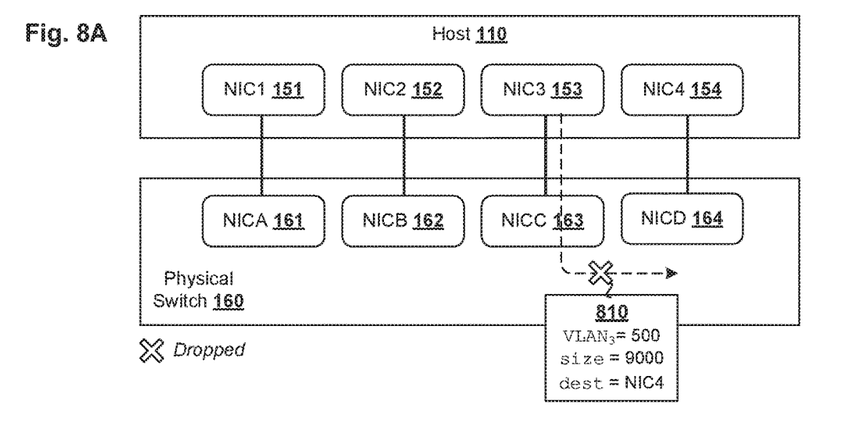
FIG. 8A is a schematic diagram illustrating an example unicast probe packet for a third iteration of a network configuration health check according to the example in FIG. 3.

FIG. 8A is a schematic diagram illustrating example unicast probe packet 810 for a third iteration of a network configuration health check. Unicast probe packet 810 is configured to perform health check for VLAN$_3$=VLAN500 and MTU=9000 bytes using "NIC3" 153 as the source NIC and "NIC4" 154 as the destination NIC. Similarly, since VLAN$_3$=VLAN500 is not supported by "NICC" 163 of physical switch 160, probe packet 810 is dropped. Further, according to 355 and 360 in FIG. 3, host 110 may resend probe packet 810 (e.g., for a predetermined number of times).

Figure 8B:
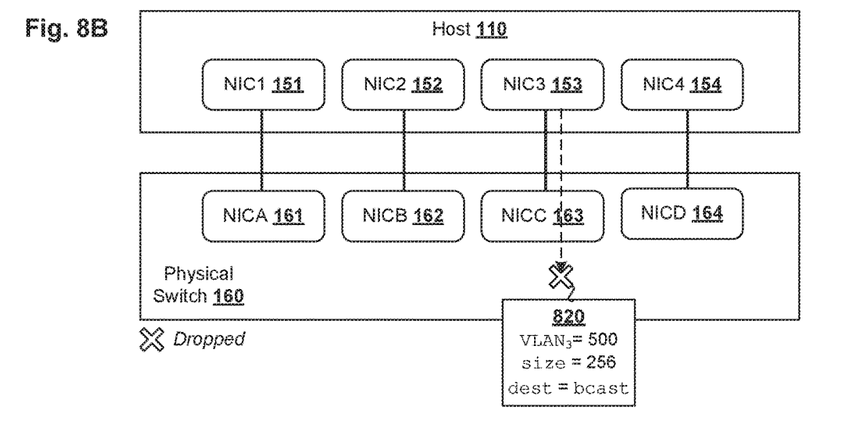
FIG. 8B is a schematic diagram illustrating an example small broadcast packet for a third iteration of a network configuration health check according to the example in FIG. 5.

FIG. 8B is a schematic diagram illustrating example small broadcast packet 820 for a third iteration of a network configuration health check according to the example in FIG. 5. Again, since "NICC" 163 of physical switch 160 does not support VLAN$_3$=VLAN500, small broadcast packet 820 is dropped. According to 545 and 555 in FIG. 3, host 110 determines that there is a mismatch between VLAN500 configuration at virtual switch 140 and the VLAN configuration at "NICC" 162 of physical switch 160 to which source "NIC3" 153 is connected.

Referring to FIG. 3 again, the above completes the third iteration. At 370 in FIG. 3, since SNIC$_3$="NIC3" 153 is the penultimate NIC, the stopping condition is met and example process 300 ends.

(d) Results

Figure 9:
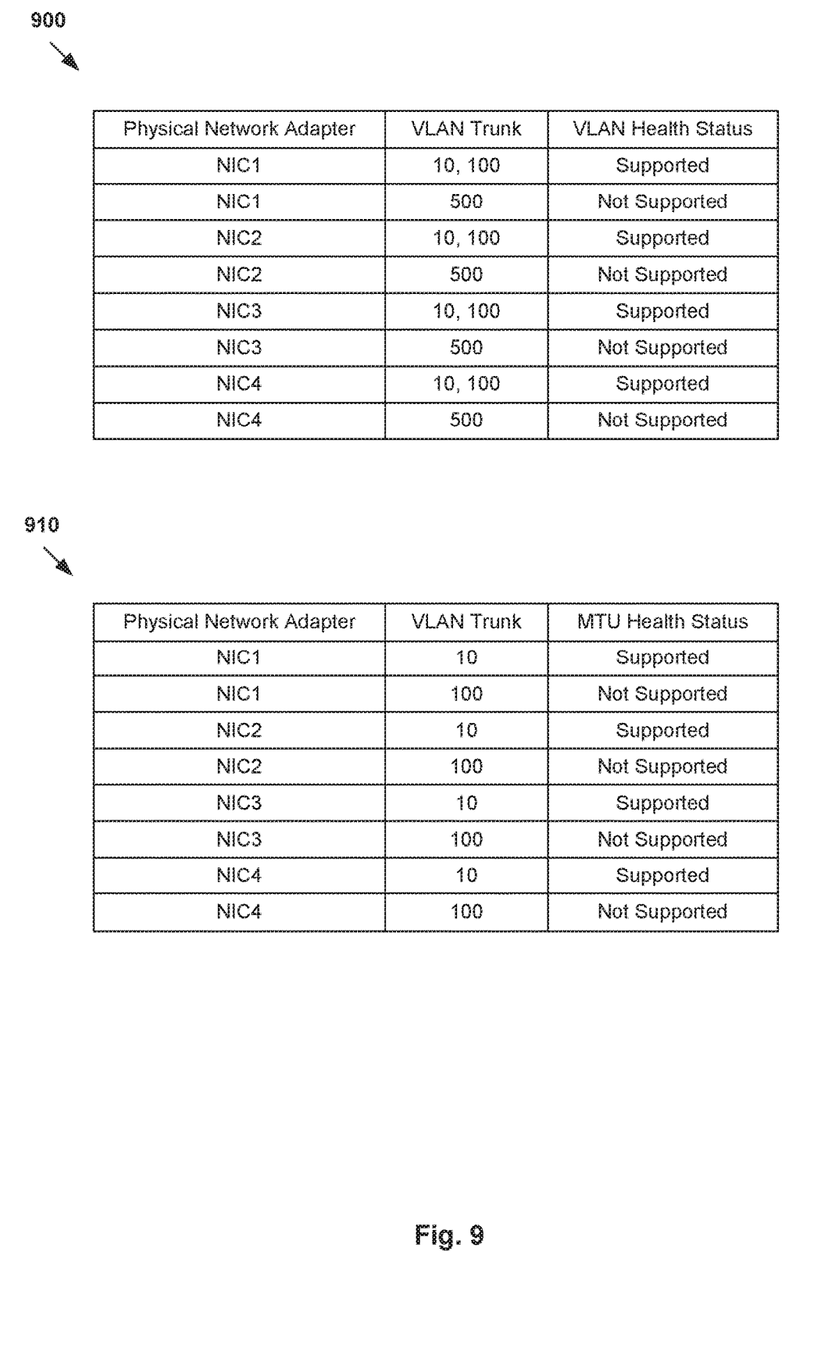
FIG. 9 is a schematic diagram illustrating example VLAN and MTU configuration health check results.

FIG. 9 is a schematic diagram illustrating example VLAN and MTU configuration health check results. Example table 900 shows results of the VLAN configuration health check after three iterations. In particular, host 110 learns that uplinks via respective "NIC1" 151, "NIC2" 152, "NIC3" 153 and "NIC4" 154 all support VLAN$_1$=VLAN10 and VLAN$_2$=VLAN100, but do not support VLAN$_3$=VLAN500. Further, example table 910 shows results of the MTU configuration health check. In particular, host 110 learns that uplinks via respective "NIC1" 151, "NIC2" 152, "NIC3" 153 and "NIC4" 154 all support MTU=9000 bytes for VLAN10, but not for VLAN$_2$=VLAN100.

The MTU mismatch in the case of VLAN$_2$=VLAN100 and VLAN mismatch in the case of VLAN$_3$=VLAN500 may be reported to a management entity (e.g., vCenter server, a trademark of VMware, Inc.). In one example, users (e.g., network administrators) may access the health check result and perform the necessary adjustments to resolve the network configuration mismatch. In practice, users (e.g., network administrators) may access the functionalities of the management entity via any suitable interface (e.g., graphical user interface, command-line interface, etc.) and/or Application Programming Interface (API) calls In another example, an automatic adjustment may be performed programmatically to, where possible, resolve the mismatch at host 110 and/or physical switch 160. In the above examples, network connectivity issues may be resolved by updating the network configuration (see 182 in FIG. 1) for NICs 161-164 of physical switch 160 to support MTU=9000 bytes for VLAN range 100-200 and also for VLAN500.

After the final iteration, the number of unicast probe packets sent by N−1 source NICs for the health check of M VLANs may be calculated as M[(N−1)+(N−2)+ . . . +1]=MN(N−1)/2. In the case of N=4 and M=3 in FIG. 1, the number of unicast probe packets is 3[3+2+1]=18. In contrast, in the case of the conventional broadcast approach, the number of ACK packets required is in the order of N(M+N−1), in addition to the initial broadcast probe packets.

As described using FIG. 1, the conventional approach creates more processing burden for both host 110 and physical switch 160, especially when health check is required the full range of 1-4094 VLANs. Also, for the health check of the VLAN range of 1-4094 using N=4 NICs, the number of entries to be added to the address lookup table (e.g., CAM table) of physical switch 160 is 16,376 entries. In contrast, according to examples of the present disclosure, only 4094 entries will be added if the first iteration is successful and all VLANs are determined to be supported.

Although the above examples are explained with reference to particular host 110 in FIG. 1, it will be appreciated that virtual switch 140 of host 110 may be configured as a member of a distributed virtual switch (DVS). The DVS represents a collection or aggregation of different virtual switches 140 spanning across different hosts 110. In practice, the DVS may be implemented using any suitable technology, such as vSphere Distributed Switch (a trademark of VMware, Inc.), etc. The DVS, being a software abstraction, may be implemented using any suitable number of components distributed in different hardware.

For example, the DVS may bind virtual switches 140 across ten different hosts 110. Assuming that host 110 initiating the health check has access to four physical NICs, then for each conventional broadcast probe packet, 39 ACKs (i.e., 3 from its physical NICs plus 9×4 from other hosts) will be transmitted to the sender host 110. When health check is required the full range of 1-4094 VLANs, 39×4094 will be generated and transmitted. Once again, this creates a lot of burden for each host 110 and physical switch 160 to process the ACK packets. In contrast, according to examples of the present disclosure, no ACK packets are required.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, when executed by the processor, cause the processor to perform processes described herein with reference to FIG. 1 to FIG. 9. For example, computing devices capable of acting as host 110 may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to perform network configuration health check in a virtualized computing environment, wherein the host includes multiple network interface controllers (NICs), the method comprising:
   selecting, from the multiple NICs, a source NIC and one or more destination NICs;
   based on a first network configuration of the host, generating one or more unicast probe packets that are addressed from the source NIC to the respective one or more destination NICs;
   sending the one or more unicast probe packets to the respective one or more destination NICs from the source NIC via a physical switch connected to the host;
   determining whether there is a match between the first network configuration of the host and a second network configuration of the physical switch based on whether the respective one or more destination NICs received the one or more unicast probe packets from the physical switch; and
   generating a result of the network configuration health check based on the determining whether there is a match between the first network configuration of the host and the second network configuration of the physical switch.

2. The method of claim 1, wherein the method further comprises:
   in response to determination that there is a mismatch between the first network configuration and second network configuration at a first iteration of the network configuration health check, performing a second iteration using a second source NIC and one or more second destination NICs, wherein the second source NIC is selected from the one or more destination NICs of the first iteration.

3. The method of claim 1, wherein the first network configuration of the host includes a virtual local area network (VLAN) configuration of a virtual switch of the host and generating the one or more unicast probe packets comprises:
based on the VLAN configuration, generating the one or more unicast probe packets to each include an identifier of the VLAN.

4. The method of claim 1, wherein the first network configuration of the host includes a maximum transmission unit (MTU) configuration of a virtual switch of the host and generating the one or more unicast probe packets comprises:
based on the MTU configuration, generating the one or more unicast probe packets to each have a size of the MTU.

5. The method of claim 1, wherein the determining whether there is a match between the first network configuration of the host and the second network configuration of the physical switch comprises:
based on a virtual local area network (VLAN) configuration and a maximum transmission unit (MTU) configuration of a virtual switch of the host, generating a broadcast packet that includes an identifier of the VLAN and has a smaller size than the MTU; and
sending the broadcast packet from the source NIC to the physical switch.

6. The method of claim 5, wherein the determining whether there is a match between the first network configuration of the host and the second network configuration of the physical switch comprises:
in response to receiving the broadcast packet from the physical switch via the one or more destination NICs, determining that the second network configuration of the physical switch matches with the VLAN configuration of the virtual switch, but does not match with the MTU configuration of the virtual switch.

7. The method of claim 1, wherein the determining whether there is a match between the first network configuration of the host and the second network configuration of the physical switch comprises:
resending the one or more unicast probe packets to the respective one or more destination NICs from the source NIC via the physical switch; and
in response to not receiving the one or more resent unicast probe packets, determining that there is a mismatch between the first network configuration and second network configuration.

8. A non-transitory computer-readable storage medium that includes a set of instructions which, in response to execution by a processor of a host, cause the processor to perform a method of network configuration health check, wherein the host includes multiple network interface controllers (NICs), the method comprising:
selecting, from the multiple NICs, a source NIC and one or more destination NICs;
based on a first network configuration of the host, generating one or more unicast probe packets that are addressed from the source NIC to the respective one or more destination NICs;
sending the one or more unicast probe packets to the respective one or more destination NICs from the source NIC via a physical switch connected to the host;
determining whether there is a match between the first network configuration of the host and a second network configuration of the physical switch, based on whether the respective one or more destination NICs received the one or more unicast probe packets from the physical switch; and
generating a result of the network configuration health check based on the determining whether there is a match between the first network configuration of the host and a second network configuration of the physical switch.

9. The non-transitory computer-readable storage medium of claim 8, wherein the method further comprises:
in response to determination that there is a mismatch between the first network configuration and second network configuration at a first iteration of the network configuration health check, performing a second iteration using a second source NIC and one or more second destination NICs, wherein the second source NIC is selected from the one or more destination NICs of the first iteration.

10. The non-transitory computer-readable storage medium of claim 8, wherein the first network configuration of the host includes a virtual local area network (VLAN) configuration of a virtual switch of the host and generating the one or more unicast probe packets comprises:
based on the VLAN configuration, generating the one or more unicast probe packets to each include an identifier of the VLAN.

11. The non-transitory computer-readable storage medium of claim 8, wherein the first network configuration of the host includes a maximum transmission unit (MTU) configuration of a virtual switch of the host and generating the one or more unicast probe packets comprises:
based on the MTU configuration, generating the one or more unicast probe packets to each have a size of the MTU.

12. The non-transitory computer-readable storage medium of claim 8, wherein the determining whether there is a match between the first network configuration of the host and the second network configuration of the physical switch comprises:
based on a virtual local area network (VLAN) configuration and a maximum transmission unit (MTU) configuration of a virtual switch of the host, generating a broadcast packet that includes an identifier of the VLAN and has a smaller size than the MTU; and
sending the broadcast packet from the source NIC to the physical switch.

13. The non-transitory computer-readable storage medium of claim 12, wherein the determining whether there is a match between the first network configuration of the host and the second network configuration of the physical switch comprises:
in response to receiving the broadcast packet from the physical switch via the one or more destination NICs, determining that the second network configuration of the physical switch matches with the VLAN configuration of the virtual switch, but does not match with the MTU configuration of the virtual switch.

14. The non-transitory computer-readable storage medium of claim 8, wherein the determining whether there is a match between the first network configuration of the host and the second network configuration of the physical switch comprises:
resending the one or more unicast probe packets to the respective one or more destination NICs from the source NIC via the physical switch; and in response to not receiving the one or more resent unicast probe packets, determining that there is a mismatch between the first network configuration and second network configuration.

15. A host configured to perform network configuration health check, the host comprising:
a processor;
multiple network interface controllers (NICs); and
a non-transitory computer-readable medium having stored thereon instructions that, when executed by the processor, cause the processor to:
select, from the multiple NICs, a source NIC and one or more destination NICs;
based on a first network configuration of the host, generate one or more unicast probe packets that are addressed from the source NIC to the respective one or more destination NICs;
send the one or more unicast probe packets to the respective one or more destination NICs from the source NIC via a physical switch connected to the host;
determine whether there is a match between the first network configuration of the host and a second network configuration of the physical switch based on whether the respective one or more destination NICs received the one or more unicast probe packets from the physical switch; and
generate a result of the network configuration health check based on the determining whether there is a match between the first network configuration of the host and a second network configuration of the physical switch.

16. The host of claim 15, wherein the instructions further cause the processor to:
in response to determination that there is a mismatch between the first network configuration and second network configuration at a first iteration of the network configuration health check, performing a second iteration using a second source NIC and one or more second destination NICs, wherein the second source NIC is selected from the one or more destination NICs of the first iteration.

17. The host of claim 15, wherein the first network configuration of the host includes a virtual local area network (VLAN) configuration of a virtual switch of the host and the instructions for generating the one or more unicast probe packets cause the processor to:
based on the VLAN configuration, generate the one or more unicast probe packets to each include an identifier of the VLAN.

18. The host of claim 15, wherein the first network configuration of the host includes a maximum transmission unit (MTU) configuration of a virtual switch of the host and the instructions for generating the one or more unicast probe packets cause the processor to:
based on the MTU configuration, generate the one or more unicast probe packets to each have a size of the MTU.

19. The host of claim 15, wherein the instructions for determining whether there is a match between the first network configuration of the host and the second network configuration of the physical switch cause the processor to:
based on a virtual local area network (VLAN) configuration and a maximum transmission unit (MTU) configuration of a virtual switch of the host, generate a broadcast packet that includes an identifier of the VLAN and has a smaller size than the MTU; and
send the broadcast packet from the source NIC to the physical switch.

20. The host of claim 19, wherein the instructions for determining whether there is a match between the first network configuration of the host and the second network configuration of the physical switch cause the processor to:
in response to receiving the broadcast packet from the physical switch via the one or more destination NICs, determine that the second network configuration of the physical switch matches with the VLAN configuration of the virtual switch, but does not match with the MTU configuration of the virtual switch.

21. The host of claim 15, wherein the instructions for determining whether there is a match between the first network configuration of the host and the second network configuration of the physical switch cause the processor to:
resend the one or more unicast probe packets to the respective one or more destination NICs from the source NIC via the physical switch; and
in response to not receiving the one or more resent unicast probe packets, determine that there is a mismatch between the first network configuration and second network configuration.

* * * * *